United States Patent [19]

Okada et al.

[11] Patent Number: 4,961,353
[45] Date of Patent: Oct. 9, 1990

[54] GEAR STRUCTURE

[75] Inventors: Masahiro Okada; Hiroki Matsumoto, both of Kanagawa, Japan

[73] Assignee: Ikeda Bussan Co., Ltd., Ayase, Japan

[21] Appl. No.: 345,184

[22] Filed: May 1, 1989

[30] Foreign Application Priority Data

Aug. 31, 1988 [JP] Japan .................................. 63-217335

[51] Int. Cl.⁵ .............................................. F16H 55/17
[52] U.S. Cl. ...................................... 74/457; 74/89.19; 74/449; 74/434; 74/435
[58] Field of Search ............. 49/341, 342; 74/434, 74/435, 89.19, 449, 457

[56] References Cited

U.S. PATENT DOCUMENTS

| 1,819,574 | 8/1931 | Sheard | 49/341 X |
| 2,119,048 | 5/1938 | Garrison | 49/342 X |
| 2,732,726 | 1/1956 | Hakanson | 49/342 X |
| 3,183,734 | 5/1965 | Kontzmann | 74/434 |
| 3,890,853 | 6/1975 | Feltz | 74/435 |
| 3,918,313 | 11/1975 | Montagnino | 74/435 X |
| 4,570,510 | 2/1986 | Babak | 74/435 X |
| 4,603,597 | 8/1986 | Onorati | 74/434 |
| 4,821,975 | 4/1989 | Vetsuki et al. | 74/435 X |

FOREIGN PATENT DOCUMENTS

| 74189 | 3/1983 | European Pat. Off. . |
| 164707 | 12/1985 | European Pat. Off. . |
| 798591 | 7/1958 | United Kingdom . |
| 927741 | 6/1963 | United Kingdom . |
| 1383351 | 2/1975 | United Kingdom . |
| 1574933 | 9/1980 | United Kingdom . |
| 2197605 | 5/1988 | United Kingdom . |

*Primary Examiner*—Timothy V. Eley
*Assistant Examiner*—Frances Chin
*Attorney, Agent, or Firm*—Foley & Lardner, Schwartz, Jeffery, Schwaab, Mack, Blumenthal & Evans

[57] ABSTRACT

Disclosed herein is a gear structure which comprises a sectoral base member of metal plate; and an arcuate flange portion integrally formed on an arcuate flange portion integrally formed on an arcuate peripheral portion of the sectoral base member. The arcuate flange portion is formed on an outer surface of thereof with forged teeth. A method of producing the gear structure is also disclosed, which comprises (a) preparing a sectoral member of metal plate, the sectoral member including a sectoral base portion and an arcuate flange portion which is integrally formed on an arcuate peripheral portion of the sectoral base portion; (b) putting the sectoral member into a press device in such a manner that the arcuate flange portion is intimately sandwiched between first and second dies, the second die having formed thereon teeth which face the arcuate flange portion; and (c) pressing the arcuate flange portion by such a degree that the arcuate flange portion is deformed to define thereon teeth by the provision of the toothed second die.

6 Claims, 3 Drawing Sheets

GEAR STRUCTURE

BACKGROUND OF THE INVENTION

1. Field of the Invention

The present invention relates in general to a gear structure and a method of producing the same, and more particularly, to a gear structure which has forged teeth formed thereon and a method of producing the same.

2. Description of the Prior Art

In order to clarify the task of the present invention, a seat reclining device to which one conventional gear structure is practically applied will be described with reference to FIG. 6 of the accompanying drawings.

The seat reclining device 1 comprises a base member 2 which is secured to a seat cushion part (not shown). A pivot shaft 3 is secured to the base member 2, which passes through an opening 5b of a toothed upper member 5. The toothed upper member 5 is secured to a pivot arm 4 which is secured to a lower portion of a seatback part (not shown). Thus, the seatback part is pivotal about the pivot shaft 3 relative to the seat cushion part. The teeth of the upper member is designated by numeral 5a. Latchingly engageable with the teeth 5a of the upper member 5 is a toothed lower member 7 which is pivotally supported by the base 2 through a pivot pin 6. Designated by numeral 7a is the teeth of the lower member, and 7b is an opening through which the pivot pin 6 passes. Although not shown in the drawing, suitable biasing means, such as spring or the like, is incorporated with the toothed lower member 7 to bias the same toward the toothed upper member 5. Thus, usually, the seatback part is kept locked at an desired angular position relative to the seat cushion part. However, when the toothed lower member 7 is disengaged from the toothed upper member 5 against the force of the biasing means, the seatback part is permitted to pivot freely relative to the seat cushion part.

It is known that, upon a seat occupant having his back pressed against the seatback part, a remarkable load is applied to the lockingly engaged teeth 5a and 7a of the upper and lower members 5 and 7. Thus, hitherto, in order to withstand such remarkable load, the upper and lower members 5 and 7 have been produced from a relatively thick metal plate by using, for example, so-called "hot gear rolling method".

In the hot gear rolling method, a toothed die is used, which is rotated to continuously press the toothed work portion thereof against a peripheral portion of a base metal plate where teeth are to be formed.

However, due to the inherency of this method, it is difficult to provide each tooth of the produced gear with a bilateral symmetry. That is, as is shown in FIG. 7, the method tends to fail to equalize the angles A and B of each tooth 10, each angle A (or B) being defined between a center plane 100 which passes through both a center (not shown) of the gear and a top of the tooth 10 and a side plane 100A (or 100B) which includes a front (or rear) side of the tooth 10. Furthermore, using a thicker metal plate causes not only increase in production cost of the toothed members but also weighty construction of the reclining device assembly.

SUMMARY OF THE INVENTION

It is therefore an object of the present invention to provide a gear structure which is free of the above-mentioned drawbacks.

According to the present invention, there is provided a gear structure of metal plate which has a flanged peripheral portion whose outer side is formed with forged teeth.

According to one aspect of the present invention, there is provided a gear structure which comprises a sectoral base member of metal plate; and an arcuate flange portion integrally formed on an arcuate peripheral portion of the sectoral base member. The arcuate flange portion is formed on an outer surface of thereof with forged teeth.

According to the other aspect of the present invention, there is provided a method of producing the gear structure. The method comprises (a) preparing a sectoral member of metal plate, the sectoral member including a sectoral base portion and an arcuate flange portion which is integrally formed on an arcuate peripheral portion of the sectoral base portion; (b) putting the sectoral member into a press device in such a manner that the arcuate flange portion is intimately sandwiched between first and second dies, the second die having formed thereon teeth which face the arcuate flange portion; and (c) pressing the arcuate flange portion by such a degree that the arcuate flange portion is deformed to define thereon teeth by the provision of the toothed second die.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
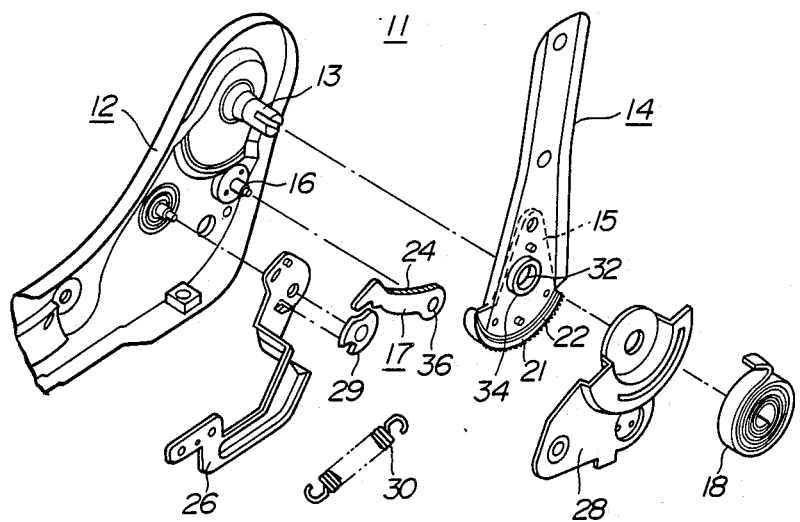
FIG. 1 is an exploded view of a seat reclining device in which a gear structure of the present invention is practically used.

Referring to FIG. 1, there is shown a seat reclining device 11 to which a gear structure of the present invention is practically applied.

The seat reclining device 11 comprises generally a base member 12 secured to a seat cushion part (not shown), a pivot shaft 13 secured to the base member 12, and a pivot arm 14 secured to a seatback part (not shown) and pivotally supported by the pivot shaft 13.

The pivot arm 14 has at its lower part a toothed upper member 15 bolted thereto. A toothed lower member 17 is pivotally connected through a pin 16 to the base member 12. A spiral spring 18 is arranged between the base member 12 and the pivot arm 14 to bias the pivot arm 14 forward, that is, leftward in FIG. 1.

Figure 5:
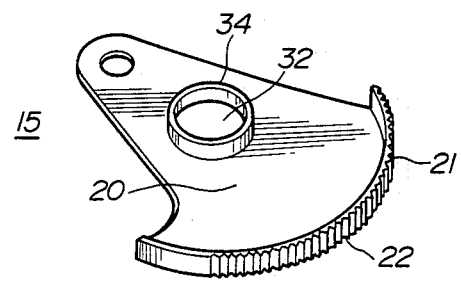
FIG. 5 is a perspective view of the gear structure of the invention.
Figure 6:
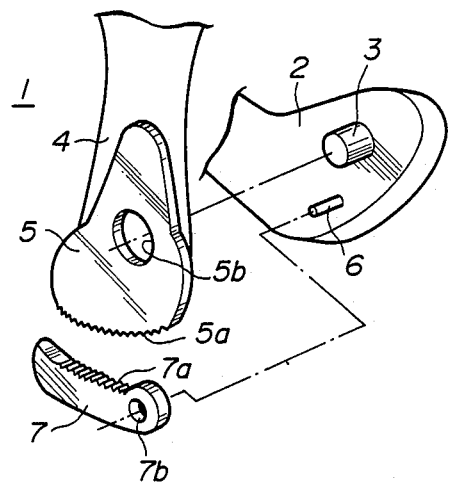
FIG. 6 is an exploded view of a seat reclining device in which a conventional gear structure is used.
Figure 7:
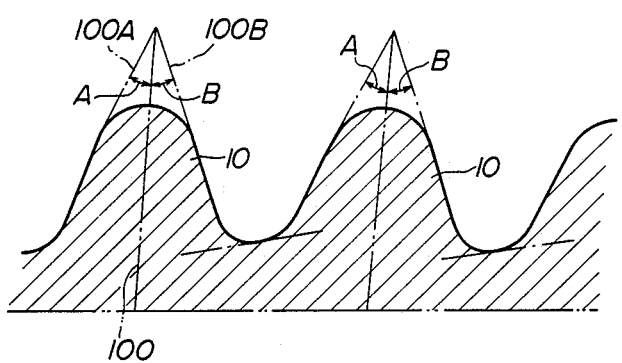
FIG. 7 is an enlarged sectional view of teeth of the conventional gear structure.

As is best seen from FIG. 5, the toothed upper member 15 comprises a sectoral portion 20 with an arcuate flange 21 which is formed at its outer surface with teeth 22. As is seen from FIG. 1, the toothed lower member 17 is formed at its upper side with teeth 24 which are lockingly engageable with the teeth 22 of the toothed upper member 15. Slidably engaged with the toothed lower member 17 is a cam 29 which is carried on an actuating lever 26. The actuating lever 26 is pivotally supported by the base member 12. Designated by numeral 30 is a spring which biases the actuating lever 26 in one direction to cause the cam 29 to press the toothed lower member 17 against the teeth 22 of the toothed upper member 15. Thus, usually, the seatback part is kept locked at an angular position relative to the seat cushion part. However, when the actuating lever 26 is pivoted in the other direction against the force of the spring 30, the teeth 24 of the toothed lower member 17 are disengaged from those 22 of the toothed upper member 15. Under this condition, the seatback part is permitted to pivot freely relative to the seat cushion part.

In the following, the steps of producing the toothed upper member 15 will be described with reference to FIGS. 2 and 3.

Figure 2:
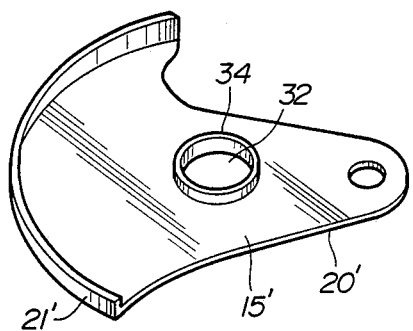
FIG. 2 is a perspective view of a sectoral metal member from which the gear structure of the present invention is produced.

As is seen from FIG. 2, a sectoral member 15' is stamped out from a suitable metal plate, which comprises a sectoral base portion 20' and an arcuate flange portion 21'. The base portion 20' is formed with an opening 32 defined by a collar 34. As will be understood from FIG. 1, the collared opening 32 has the pivot shaft 13 passed therethrough. Thus, the opening 32 defines an axis about which the sectoral member 15' is rotatable.

Figure 3:
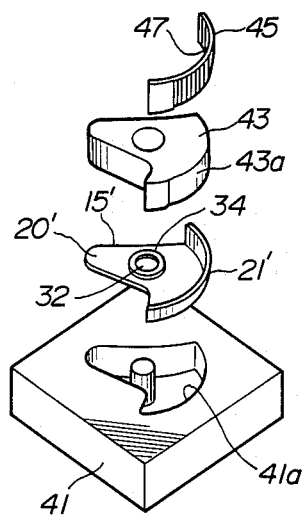
FIG. 3 is an exploded view of a press device by which the gear structure of the invention is produced.

Then, as is seen from FIG. 3, the sectoral member 15' is put into a teeth forming press device. The press device comprises a lower mold 41 having a recess 41a formed therein, a base or first die 43, an arcuate or second die 45 and an upper mold 49 (see FIG. 4). The recess 41a of the lower mold 41 is shaped to match with the sectoral member 15' which is to be pressed. The base die 43 has an arcuate peripheral wall 43a which is shaped to match with an inner wall of the arcuate flange portion 21' of the sectoral member 15'. The arcuate die 45 has at its arcuate inner wall a plurality of teeth 47. Each tooth 47 of the arcuate die 45 extends perpendicular to a direction in which the arcuate die 45 extends, as will be seen from FIG. 3.

First, the sectoral member 15' is put into the recess 41a of the lower mold 41 having the arcuate flange portion 21' directed upward. Then, the base die 43 is put on the sectoral member 15' and placed in such a manner that the arcuate peripheral wall 43a thereof intimately contacts with arcuate flange portion 21' of the sectoral member 15'. Then, the arcuate die 45 is thrusted into an arcuate space which is defined between the outer wall of the arcuate flange portion 21' of the sectoral member 15' and a corresponding inner wall of the recess 41a of the lower mold 41.

Figure 4:
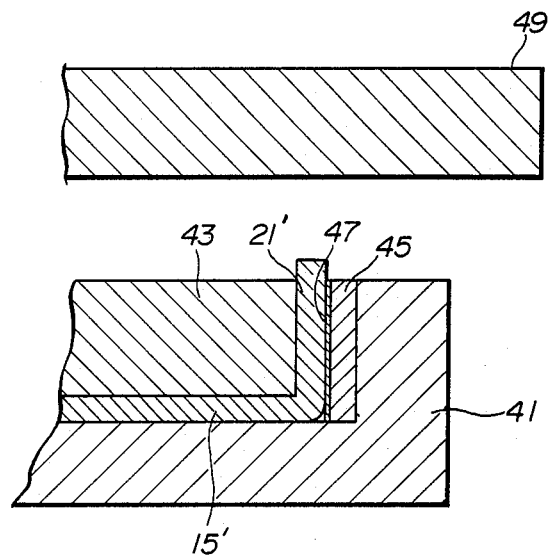
FIG. 4 is a partial sectional view of the press device under a condition wherein the gear structure of the invention is being produced.

Under this condition, as is seen from FIG. 4, the arcuate flange portion 21' of the sectoral member 15' is slightly projected outward from the remaining members. Then, the upper mold 49 is pressed down against the lower mold 41 pressing the arcuate flange portion 21'. Thus, the actuate flange portion 21' is forced to form on the outer surface thereof forged teeth 22 (see FIG. 5) due to provision of the toothed arcuate die 45.

It is to be noted that the forged teeth 24 of the toothed lower member 17 are produced by employing substantially same method.

In the following, advantages of the invention will be described.

Because the teeth forming arcuate die 45 is kept stationary during the pressing work, each tooth 22 produced on the actuate flange portion 21' of the sectoral member 15' is given a bilateral symmetry unlike the case of the afore-mentioned conventional method. Since a relatively wide or thick toothed portion 22 of the gear structure 15 can be produced from a relatively thin metal plate, economical production is available in the invention.

What is claimed is:

1. A gear structure comprising:
   a sectoral base portion; and
   an arcuate flange portion raised at generally normal angles from an arcuate periphery of said sectoral base portion and extending along said arcuate periphery, wherein said sectoral base portion and said arcuate flange portion consist of a unitary member constructed of a stamped metal plate, and
   said arcuate flange portion is formed at its outer surface with forged teeth.

2. The structure of claim 1, in which said sectoral base member is formed with an opening which defines an axis about which said gear structure is rotatable.

3. The gear structure of claim 2, in which each tooth on said arcuate flange portion extends in parallel with said axis.

4. The gear structure of claim 3, in which said opening of said sectoral base member is defined by a collar.

5. The gear structure of claim 1, produced by a process comprising the steps of:
   (a) preparing a sectoral member of metal plate, said sectoral member including a sectoral base portion and an arcuate flange portion which is integrally formed on an arcuate peripheral portion of said sectoral base portion;
   (b) putting said sectoral member into a press device in such a manner that the arcuate flange portion is intimately sandwiched between first and second dies, said second die having formed thereon teeth which face said arcuate flange portion; and
   (c) pressing said arcuate flange portion by such a degree that the arcuate flange portion is deformed to define thereon teeth by the provision of the toothed second die.

6. The gear structure of claim 5, in which after achieving the step (b), a top portion of said arcuate flange portion is slightly projected outward from said first and second dies, said top portion being pressed in step (c).

* * * * *